United States Patent [19]

Broekhuis et al.

[11] Patent Number: 4,940,756
[45] Date of Patent: Jul. 10, 1990

[54] ELASTOMERS AND TIRES CONTAINING THEM

[75] Inventors: Antonius A. Broekhuis; Pieter Luijk; Jan E. Stamhuis, all of Amsterdam, Netherlands

[73] Assignee: Shell Oil Company, Houston, Tex.

[21] Appl. No.: 300,244

[22] Filed: Jan. 20, 1989

Related U.S. Application Data

[63] Continuation of Ser. No. 124,307, Nov. 23, 1987, abandoned.

[30] Foreign Application Priority Data

Dec. 2, 1986 [GB] United Kingdom ............... 8628838

[51] Int. Cl.$^5$ .................. C08F 297/04; C08L 9/00; C08L 9/06
[52] U.S. Cl. ........................ 525/237; 524/528; 524/534; 525/89; 525/314; 525/931; 152/209 R
[58] Field of Search ............. 525/314, 931, 89, 236, 525/237

[56] References Cited

U.S. PATENT DOCUMENTS

| | | | |
|---|---|---|---|
| 4,304,881 | 12/1981 | Aoki et al. | 525/314 |
| 4,373,069 | 2/1983 | Bond et al. | 525/237 |
| 4,396,743 | 8/1983 | Fujimaki et al. | 525/99 |
| 4,427,831 | 1/1984 | Komuro et al. | 525/237 |
| 4,433,109 | 2/1984 | Takeuchi et al. | 525/314 |
| 4,616,065 | 10/1986 | Hargis et al. | 525/99 |
| 4,843,120 | 6/1989 | Halasa et al. | 525/237 |
| 4,845,154 | 7/1989 | Blythe et al. | 525/237 |

FOREIGN PATENT DOCUMENTS

| | | | |
|---|---|---|---|
| 0026016 | 2/1985 | Japan | 525/314 |
| 61-197645A | 9/1986 | Japan | |
| 2158076A | 11/1985 | United Kingdom | |

OTHER PUBLICATIONS

Akira Todo, Domain-Boundary Structure of Styrene-Isoprene Block Copolymer Films Cast from Solutions, III. Preliminary Results on Spherical Microdomains, Aug. 1977, pp. 587–597.

Long, Anionic Synthesis and Characterization of Alkyl Methacrylate Containing Polymeric Systems, PhD Dissertation, Virginia Polytechnic Institute and State University, (1987).

Primary Examiner—Wilbert J. Briggs, Sr.

[57] ABSTRACT

An elastomeric composition suitable for tires comprising (A) 5 to 50% by weight of copolymer block (A) of an aromatic vinyl compound and a conjugated diene and containing 52–90% wt of vinyl compound and having an average mol. wt. >20,000 and a vinyl content in the diene units of <20% wt, and (B) 95–50% by weight of a block (B) which is a homopolymer of a conjugated diene or a copolymer block of an aromatic vinyl compound and a conjugated diene, block (B) containing <20% wt. of aromatic vinyl compound and having a Tg < −40°°C., after vulcanization blocks (A) and (B) being incompatible.

12 Claims, 7 Drawing Sheets

ELASTOMERS AND TIRES CONTAINING THEM

This is a continuation of application Ser. No. 124,307, filed Nov. 23, 1987, now abandoned.

BACKGROUND

The invention relates to elastomeric compositions suitable for use in the tread portion of a pneumatic tire, to processes of producing them, to unvulcanized elastomeric compositions containing them and to tires containing the elastomeric compositions in a vulcanized state.

Elastomeric compositions suitable for use in the tread portion of a pneumatic tire should yield tires having a low rolling resistance for low fuel consumption, a high wet grip Performance for good running safety of automobiles and a high resistance against abrasion. Two general classes of tread compounds can be distinguished:

(a) those giving high wet grip performance combined with high heat build-up characteristic, relatively high rolling resistance, a low resistance against abrasion and having a glass transition temperature above minus 55° C., and (b) those giving relatively low wet grip performance combined with low heat build-up characteristics, relatively low rolling resistance, a high resistance against abrasion and having a glass transition temperature below minus 65° C.

From the above it follows that it is difficult to combine a low rolling resistance with a high wet grip performance.

In U.S. Pat. No. 4,396,743 elastomeric compositions are described which mainly consist of a rubber mixture consisting of 20–95 parts by weight of a styrene-butadIene block copolymer and 80–5 parts by weight of a diene rubber; the styrene-butadiene block copolymer consists of a random copolymer block (A) and a random copolymer block (B), block (A) having a bonded styrene content of 20–50% by weight and a vinyl content in the butadiene unit of 40–75% by weight and block (B) having a bonded styrene content of not higher than 10% by weight and a vinyl content in the butadiene unit of 20–50%. The two blocks in this known composition are compatible with each other. As a result, the two blocks are completely compatibilized during vulcanization, the tan δ-temperature curve of the block copolymer having a broad width.

When the bonded styrene content in block (A) is higher than 50% by weight a rubber composition containing such a block copolymer is poor in rolling resistance.

In British patent application No. 2,158,076 elastomeric compositions are described which contain a styrene-butadiene block copolymer containing a random copolymer block (A) and a polybutadiene block (B), block (A) having a content of bound styrene of 10–80% by weight and a vinyl content in the butadiene unit of 30–70%, the content of vinyl bonds in block (B) being not more than 60%, each of the blocks (A) and (B) being included in the block copolymer in an amount of at least 20% by weight, the average vinyl content in block (A) being higher by at least 5% than that in block (B), block (A) having a glass transition temperature higher by at least 30° C. than that of block (B) and satisfying three further requirements. According to this specification a vinyl content in the copolymer block (A) of less than 30% unfavorably affects the difference in glass transition temperatures between the copolymer blocks (A) and (B) and unsatisfactorily affects the balance between the rolling resistance and the wet grip performance. The rolling resistance is expressed as the loss tangent tan δ determined at a temperature of 50° C. and the wet grip performance as tan δ determined at a temperature of 0° C. For an explanation of the loss tangent reference is made to "Handbook of Plastics Test Methods", edited by R. P. Brown, 1981, Chapter Nine.

SUMMARY OF THE INVENTION

It has now been found that, when block (A) has a low vinyl content and a high content of aromatic vinyl compound and this block (A) and a block (B) are incompatible after vulcanization of the elastomeric composition, the vulcanized compositions have an exceptionally high wet grip performance, a high resistance against abrasion and a low rolling resistance.

Accordingly, the invention provides an elastomeric composition suitable for use in the tread portion of a pneumatic tire, said composition comprising (1) in the range of from 5 to 50% by weight of a copolymer block (A) of an aromatic vinyl compound and a conjugated diene and having a content of aromatic vinyl compound in the range of from 52 to 90% by weight, an apparent molecular weight of more than 25,000 and a vinyl content in the conjugated diene units of less than 20% by weight and (2) in the range of from 95 to 50% by weight of a block (B) which is a homopolymer of a conjugated diene or a copolymer block of an aromatic vinyl compound and a conjugated diene, said block (B) containing less than 20% by weight of an aromatic vinyl compound and having a glass transition temperature below minus 40° C., whereby after vulcanization of the elastomeric composition, block (A) is incompatible with block (B).

It is a feature of the present elastomeric compositions that blocks (A) and (B) are incompatible with each other, that is to say that the tan δ-temperature curve of the block copolymer in the vulcanized state has two maxima. These two maxima will generally be in the temperature range of from minus 100° C. to plus 50° C. Preferably, a first maximum is present in the range of from plus 30° C. to minus 20° C. and a second maximum is present at a temperature of not higher than minus 40° C. in a curve representing tan δ of the vulcanized composition as a function of the temperature, measured at a frequency of 10 Hz and 0.5% strain amplitude, the first maximum, indicating said very high resistance against abrasion. The second maximum is preferably in the range of from plus 10° C. to minus 10° C, indicating said exceptionally high wet grip performance. Blocks (A) and (B) may be random, tapered or block copolymers. Copolymer block A and block B may be present as two separate entities, that is to say as a physical mixture, but copolymer block A and block B are preferably present in one block copolymer, that is to say as one entity.

BRIEF DESCRIPTION OF THE DRAWINGS

FIGS. 4–9 are plots of tan δ vs. temperature for vulcanized elastomer compositions prepared for comparison to the compositions of FIGS. 1–3.

DETAILED DESCRIPTION OF THE INVENTION

Figure 1:
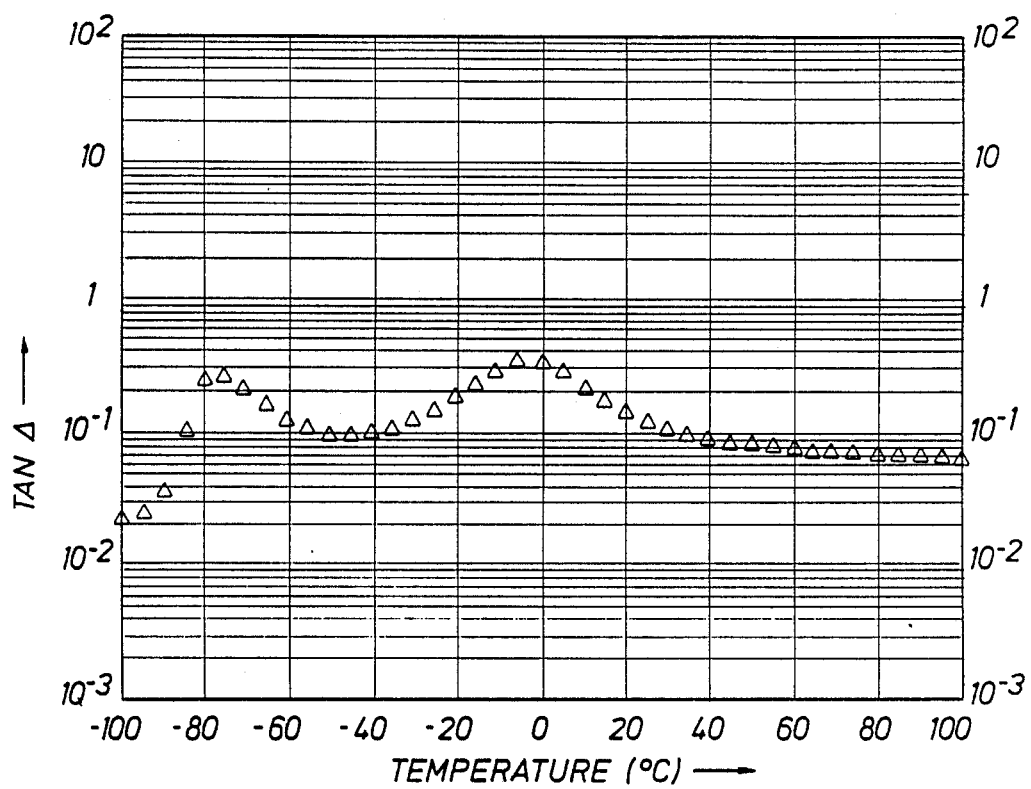
FIGS. 1–3 are plots of tan δ vs. temperature for vulcanized elastomeric compositions prepared in accordance with the present invention.

Block copolymers of particular interest contain blocks (A) and (B) in contents in the range of from 20 to 40 and from 80 to 60% by weight, respectively, calculated on the block copolymer. The block copolymer may contain constituents other than blocks (A) and (B), but usually blocks (A) and (B) are the only constituents.

The aromatic vinyl compound is suitably styrene, but may be another mono-vinyl aromatic compound for example, 1-vinylnaphthalene 3,5-diethylstyrene, 4-n-propylstyrene, 2,4,6-trimethylstyrene, 4-phenylstyrene, 4-methylstyrene, 3,5-diphenylstyrene, 3-ethyl-1-vinylnaphthalene or 8-phenyl-1-vinylnaphthalene. Where, for example, branching or cross-linking is desired a polyfunctional vinyl compound can be used. For example, suitable polyfunctional vinyl compounds are divinyl compounds, for instance divinylbenzene.

The conjugated diene is one capable of co-polymerization with styrene or with another monovinyl aromatic compound and such that, when polymerized with styrene or other selected aromatic vinyl compound or compounds, it provides a polymer having desired elastomeric properties. The diene is suitable 1,3-butadiene, but may be another diene, for example 1,3-pentadiene, Z-methyl-1,3-butadiene (isoprene), 2,3-dimethyl-1,3-butadiene, 2-methyl-1,3-pentadiene, 2,3-dimethyl-1,3-pentadiene or 2-phenyl-1,3-butadiene.

Very good results have been obtained with blocks (A) and (B) derived from styrene and 1,3-butadiene.

The apparent average molecular weight of block (A) is preferably in the range of from 25,000 to 175,000, so as to ensure the exceptionally high wet grip performance.

The term "vinyl content" as used herein refers to that portion by weight of the conjugated diene component of the copolymer which has polymerized at the 1,2-positions. When the diene is 1,3-butadiene the 1,2-polymerization results in the formation of pendant vinyl groups; where the diene is other than 1,3-butadiene corresponding pendant groups are produced by 1,2-polymerization. Very good results have been obtained when the vinyl content of the conjugated diene in block (A) is less than 15% by weight, calculated on total butadiene. Block (B) preferably also has a vinyl content of less than 20% by weight; suitably, the conjugated diene portion in blocks (A) and (B) have substantially the same vinyl contents. The contents of vinyl bonds in the conjugated diene portions in blocks (A) and (B) have a distribution width which is not critical and may vary, but is suitably less than 9% and very suitably substantially zero. The term "distribution width" refers to a change of vinyl content along one molecular chain.

The glass transition temperature (Tg) is the value found by means of differential scanning calorimetry. Block (B) preferably has a glass transition temperature below minus 70° C.

The block copolymers present in the elastomeric compositions according to the present invention can be obtained by subjecting a mixture of the aromatic vinyl compound and the conjugated diene to suitably chosen polymerization conditions in the presence of an initiator, such as an organo-lithiumcompound. Suitable mono-lithium initiators (providing linear polymers) are, for example, methyl lithium, ethyl lithium, n-propyl lithium, isopropyl lithium, n-butyl lithium, sec-butyl lithium, tert.butyl lithium, n-pentyl lithium, isopentyl lithium, n-hexyl lithium, n-octyl lithium and phenyl lithium.

If it is wished to produce a double or branched polymer a dilithium or other polylithium initiator can be used, for example: tetramethylene dilithium, pentamethylene dilithium, hexamethylene dilithium, phenylethylene dilithium, tetra phenylethylene dilithium. Polylithium initiators containing more than two lithium atoms per initiator molecule, are for example, products obtained by reacting divinylbenzene with a monolithium initiator.

Suitable solvents (which can be two- or other multicomponent solvents) for the reaction are, for example, alkanes, alkenes, cycloalkanes and cycloalkenes, for instance benzene, toluene, xylenes, ethylbenzene, isobutane, n-pentane, iso-pentane, n-heptane, iso-octane, n-decane, cyclopentane, methylcyclopentane, dimethylcyclopentane, cyclohexane, methylcyclohexane, dimethylcyclohexane, 1-butene, 2-butene, 1-pentene, 2-pentene and cyclopentene.

The block copolymers are generally prepared at a temperature in the range of from 30° C. to 100° C.; preferred temperatures are in the range of from 60° C. to 80° C.

If desired, the block copolymer can be in the form of composite molecules obtained by coupling together two or more smaller copolymer molecules. Accordingly, in another aspect the invention provides an elastomeric composition in which two or more of said block copolymers have been coupled together by means of a coupling agent. The features of the present invention as described hereinafter are particularly pronounced when using elastomeric compositions obtained by coupling together, two or more of said block copolymers in which block (B) has been formed after block (A). The coupling can be effected conveniently by use of a difunctional coupling agent, for example 1,2-dibromoethane or a diisocyanate, providing a linear coupled copolymer, or a tri- or other polyfunctional coupling agent, for example the tetra-functional compounds silicon tetrachloride, diethyl adipate, dimethyl adipate or stannic chloride provide a non-linear or branched coupled copolymer. Where the coupling is only partly complete, for example at 50% of the theoretical amount, the product of the coupling reaction consists partly of coupled block copolymer and partly of uncoupled block copolymer.

The polymerization process can be terminated by use of an end-stopping agent; this can be a proton-releasing compound, for instance water, an alcohol or an amine.

The elastomeric compositions according to the present invention may be compounded with the usual compounding ingredients, such as vulcanizing agents, vulcanization accelerating agents, vulcanization activating agents, antioxidants, fillers and extender oils which may be naphthenic, paraffinic or, which is preferred, aromatic. The preferred vulcanizing agent is sulphur and the preferred filler is carbon black; the curve representing tan δ of the vulcanized compositions as a function of the temperature is determined using an aromatic extender oil, carbon black as a filler and sulphur as a vulcanizing agent. The carbon black is preferably present in an amount in the range of from 20 to 120 parts by weight, calculated on 100 parts by weight of block copolymer. Sulphur is preferably present in an amount in the range of from 0.5 to 5 parts by weight, calculated on 100 parts by weight of block copolymer. Other examples of vulcanizing agents are 4,4'-dithiomorpholine and alkylphenol disulphides. The elastomeric compositions may further contain other inorganic fillers, for example silica, bentonite, clay, titanium oxide, talc, diatomaceous earth, chalk and china clay. Examples of vulcanization activating agents which may be present are zinc oxide and stearic acid. Examples of antioxidants which may be present are N-phenyl-N'-isopropyl-p-phenylenediamine, phenyl-β-naphthylamine and 2-mercaptobenzimidazole. Examples of vulcanization accelerating agents are N-cyclohexyl-2-benzothiazyl sulphenamide and the Santocure MOK described hereinafter.

The invention is further illustrated by means of the following Examples.

The trade names used hereinafter have the following signification: "Dutrex" is an aromatic extender oil having a density 20/4° C. of 0.996, carbon atoms in aromatic structure 40%, in naphthenic structure 34% and in paraffinic structure of 26% and a kinematic viscosity at 37.8° C. and 100° C. of 727 and 17.3 mm²/s.

"Carbon black ISAF N 220" is an intermediate superabrasion furnace black according to ASTM D 1765.

"Santoflex 13" is N-(1,3-dimethylbutyl)-N'-phenyl-p-phenylenediamine; an antidegradant.

"Santoflex 77" is N,N'-bis(1,4-dimethylphenyl)-p-phenylenediamine, an antioxidant.

"Santocure MOR" is 2-(4-morpholinyl-mercapto)-benzothiazole, an accelerator.

The curves representing tan δ of the vulcanized composition as a function of the temperature was determined over a temperature range of minus 100° C. to plus 100° C. at a strain amplitude of 0.5% and a frequency of 10 Hz. A rectangular strip specimen having a length of 35 mm, a width of 12.7 mm and a thickness of 2.1 mm was used.

The wet grip performance was assessed from dynamic mechanical measurements on cylindrical specimens having a height of 6 mm and a diameter of 6 mm, determining the ratio between the loss modulus and storage shear modulus at 0° C., 1.5Hz and 0.5% strain amplitude. The rolling resistance was measured on samples with the same geometry determining the ratio between the loss modulus and storage shear modulus at 50° C., 10 Hz and 2% strain amplitude. The apparatus used for both measurements was a Rheometrics dynamic mechanical spectrometer, type system 4. The values for tan δ were calculated as the ratIo of loss modulus and storage shear modulus. The rolling resistance Rc was calculated by means of the following equation:

$$Rc = 26.25 G'' + \frac{0.277 \times G''}{(G^*)^2} + 66$$

where G" is the loss shear modulus expressed in MPa and G* is the complex shear modulus expressed in MPa. The expression $$\frac{G''}{(G^*)^2}$$

is expressed in GN/m². The abrasion resistance has been determined according to DIN 53516.

EXAMPLES 1–3

Example 1 was carried out as follows. A stainless steel reaction vessel having a capacity of 30 l was charged with 15 l cyclohexane and heated to a temperature of 75° C. Then, an initial charge of 77 g of styrene (17.5% by weight of the total amount of styrene used in this example) and 4 g of butadiene (0.24% by weight of the total amount of butadiene used in this example) was dissolved in the cyclohexane. The polymerization was started by the addition of sec-butyllithium, thus simultaneously titrating impurities and initiating the polymerization. This initiation was immediately followed by gradual addition of a mixture of 363 g styrene (the balance of the total amount of styrene used in this example) and 246 g butadiene (15% of the total amount of butadiene used in this example) over a period of 300 min, thereby forming block (A), followed by gradual addition of 1394 g butadiene (the balance of the butadiene used in this example) over a period of 90 min, thereby forming block (B).

After the gradual additions of the monomers the active polymer chains were terminated by addition of diethyl adipate in an amount stoichiometric with respect to the amount of sec-butyllithium. The coupling reaction was continued for 20 min. The polymers were stabilized by adding 0.6% by weight of 2,6-di-tert-butyl-p-cresol, isolated by means of steam coagulation and dried at sub-atmospheric pressure.

The relevant data of Example 1 are summarized in Table 1. Examples 2 and 3 were carried out in the same manner as Example 1, with the exception of the data stated in Table 1.

Some data of the block copolymers are stated in Table 2.

TABLE 1

| Example | Initial charge styrene % total | Initial charge butadiene % total | Gradual addition styrene % total | Gradual addition butadiene % total | time min | Total amount used, styrene g | Total amount used, butadiene g |
|---|---|---|---|---|---|---|---|
| 1 | 17.5 | 0.24 | 82.5 | 15 | 300 | 440 | 1640 |
|   |      |      |      | 85 | 90  |     |      |
| 2 | 27.5 | 0.3  | 72.5 | 11.9 | 180 | 386 | 1616 |
|   |      |      |      | 88.1 | 120 |     |      |
| 3 | 23.4 | 0.23 | 76.6 | 9.6  | 240 | 610 | 2132 |
|   |      |      |      | 90.4 | 60  |     |      |

Some data of the block copolymer are stated in Table 2.

TABLE 2

| Example | Block A % by weight of block A in block copolymer | Block A styrene content, % by weight | Block A apparent mol. weight | Block B styrene content, % by weight | Block B Tg, °C. | Block A and Block B apparent mol. weight before coupling |
|---|---|---|---|---|---|---|
| 1 | 29 | 60 | 66,000 | 5 | −94 | 297,000 |

TABLE 2-continued

| | Block A | | | Block B | | Block A and Block B |
|---|---|---|---|---|---|---|
| Example | % by weight of block A in block copolymer | styrene content, % by weight | apparent mol. weight | styrene content, % by weight | Tg, °C. | apparent mol. weight before coupling |
| 2 | 24 | 60 | 47,000 | 6 | −91 | 262,000 |
| 3 | 27 | 70 | 62,000 | 8 | −92 | 293,000 |

The coupling efficiencies found in Examples 1, 2 and 3 were 74, 76 and 70%, respectively.
Both blocks in each of the three block copolymers had a vinyl content of 10% by weight.
The apparent molecular weights of blocks A and B were determined according to gel permeation chromotography calibrated against polystyrene samples.

Three vulcanized elastomeric compositions were produced by using the block copolymers obtained in Examples 1, 2 and 3, according to the compounding recipe shown in Table 3.

TABLE 3

| Ingredient | Parts by weight |
|---|---|
| Block copolymer | 100 |
| Zinc oxide | 5.0 |
| Stearic acid | 3.0 |
| Santoflex 13 | 1.0 |
| Santoflex 77 | 1.0 |
| Carbon black N 220 | 45 |
| Dutrex 729 HP | 7 |
| Sulphur | 1.6 |
| Santocure MOR | 1.3 |

Analytical data on the three vulcanized elastomeric compositions are presented in Table 4.

TABLE 4

| | Rolling resistance | Wet grip performance | Abrasion, mm³ |
|---|---|---|---|

| Example | Rc | tan δ at 50° C. | tan δ at 0° C. | abraded material |
|---|---|---|---|---|
| 1 | 95 | 0.17 | 0.29 | 69 |
| 2 | 93 | 0.16 | 0.18 | 65 |
| 3 | 96 | 0.18 | 0.21 | 62 |

Table 4 shows that the vulcanized elastomeric compositions obtained in Example 1 had an exceptionally high wet grip performance and a high resistance against abrasion at low rolling resistance.

Figure 2:
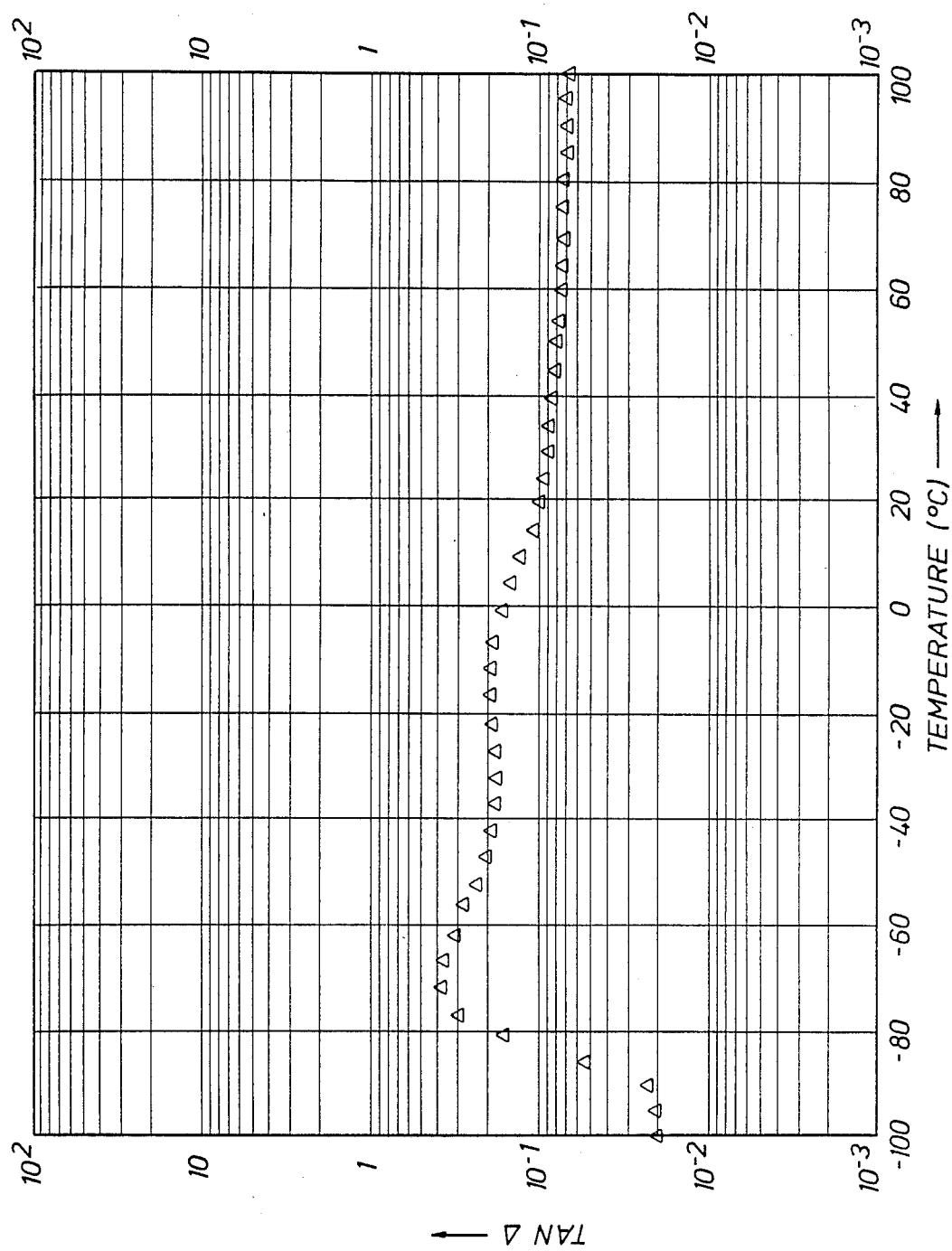
Figure 3:
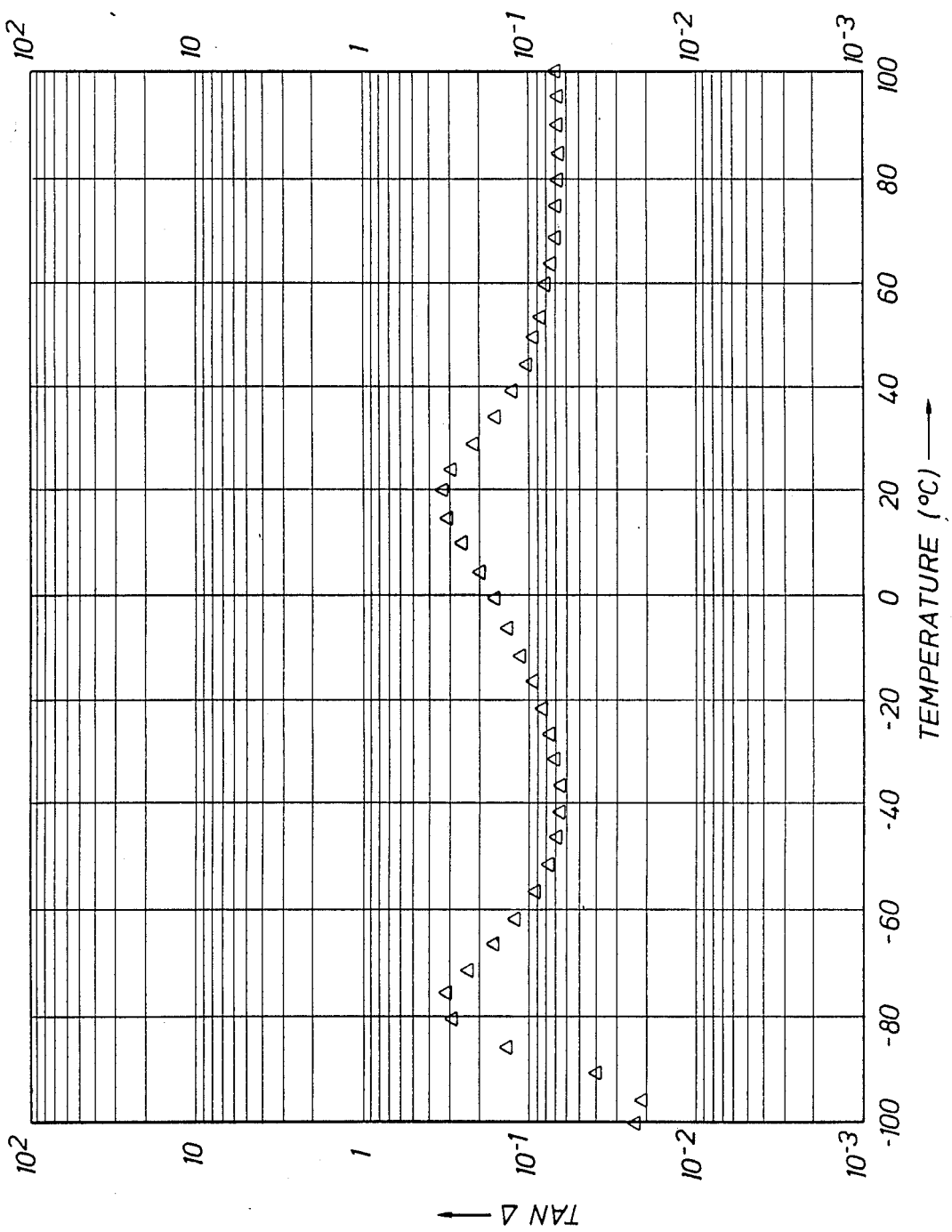

In FIGS. 1, 2 and 3 of the drawings the values of tan δ are plotted against the temperature, in ° C., for Examples 1, 2 and 3 respectively. It can be seen that one of the two maxima in each of the curves is situated in the range plus 30° C. to minus 20° C. and that the second maximum has a value not higher than minus 50° C. The best results are obtained in Example 1 where the first maximum is situated at a temperature of about 0° C.

COMPARATIVE EXPERIMENTS A-E

Comparative Experiments A, B, C, D and E were carried out in the same manner as Example 1 with the exception of the data stated in Table 5, in that the temperature in Comparative Experiments D and E was 70° C., and that in Comparative Experiment D 2,2-dimethyl-3,6-dioxadecane was present as a modifier, during the first and second gradual monomer addition in an amount of 150 and 500 parts per million, respectively, calculated on the total of cyclohexane and monomers.

TABLE 5

| | Initial charge | | Gradual addition, | | | Total amount used, | |
|---|---|---|---|---|---|---|---|
| Comparative Experiment | styrene % total | butadiene % total | styrene % total | butadiene % total | time min | styrene g | butadiene g |
| A | 39.5 | 0.7 | 35.1 | 8.3 | 60 | 380 | 1620 |
| | | | 25.4 | 81.0 | 120 | | |
| | | | 0 | 10.0 | 60 | | |
| B | 22.0 | 0.42 | 78.0 | 19.9 | 240 | 428 | 1675 |
| | | | | 79.7 | 120 | | |
| C | 28.2 | 0.29 | 37.3 | 4.6 | 90 | 502 | 1745 |
| | | | 34.5 | 95.1 | 83 | | |
| D | 1.7 | 0.05 | 7.3 | 71.0 | 120 | 1133 | 1725 |
| | | | 28.1 | 0 | 1 | | |
| | | | 62.9 | 29.0 | 36 | | |
| E | 40 | 1.3 | 0 | 0 | 90 | 497 | 1749 |
| | | | 28 | 7.8 | 1 | | |
| | | | 32 | 90.9 | 119 | | |

Some data of the block copolymers are stated in Table 6.

TABLE 6

| | Block A | | | Block B | | Block A and Block B |
|---|---|---|---|---|---|---|
| Comparative Experiment | % by weight of block A in block copolymer | styrene content, % by weight | apparent mol. weight | styrene content, % by weight | Tg °C. | apparent mol. weight |
| A | 14 | 50 | 29,000 | 13 | −81 | 252,000 |
| B | 33 | 50 | 74,000 | 6 | −91 | 224,000 |
| C | 14 | 70 | 25,000 | 10 | −89 | 248,000 |
| D | 51 | 60 | 90,000 | 7 | −70 | 171,000 |
| E | 7 | 90 | 16,000 | 11 | −89 | 180,000 |

The apparent molecular weights of blocks A and B were determined in the same manner as indicated for Table 2.

The coupling efficiencies are stated in Table 7.

TABLE 7

| Comparative Experiment | Coupling Efficiency, % |
|---|---|
| A | 80 |
| B | 80 |
| C | 66 |
| D | not coupled |

TABLE 7-continued

| Comparative Experiment | Coupling Efficiency, % |
|---|---|
| E | 78 |

Blocks (A) and (B) in Comparative Experiments A, B, C and E had a vinyl content of 10% by weight. Blocks (A) and (B) in Comparative Experiment D had a vinyl content of 50 and 30%, respectively.

The vulcanized elastomeric compositions were prepared in the same manner as in Examples 1, 2 and 3. Analytical data on the five vulcanized compositions are presented in Table 8.

TABLE 8

| Comparative Experiment | Rolling resistance Rc | tan δ at 50° C. | Wet grip performance tan δ at 0° C. | Abrasion, mm³ abraded material |
|---|---|---|---|---|
| A | 92 | 0.15 | 0.12 | 57 |
| B | 95 | 0.18 | 0.14 | 88 |
| C | 95 | 0.17 | 0.14 | 72 |
| D | 123 | 0.34 | 0.19 | 160 |
| E | 100 | 0.18 | 0.09 | 78 |

In FIGS. 4, 5, 6, 7 and 8 of the drawing the values of tan δ are plotted against the temperature in ° C., for Comparative Experiments A, B, C, D and E, respectively.

Figure 4:
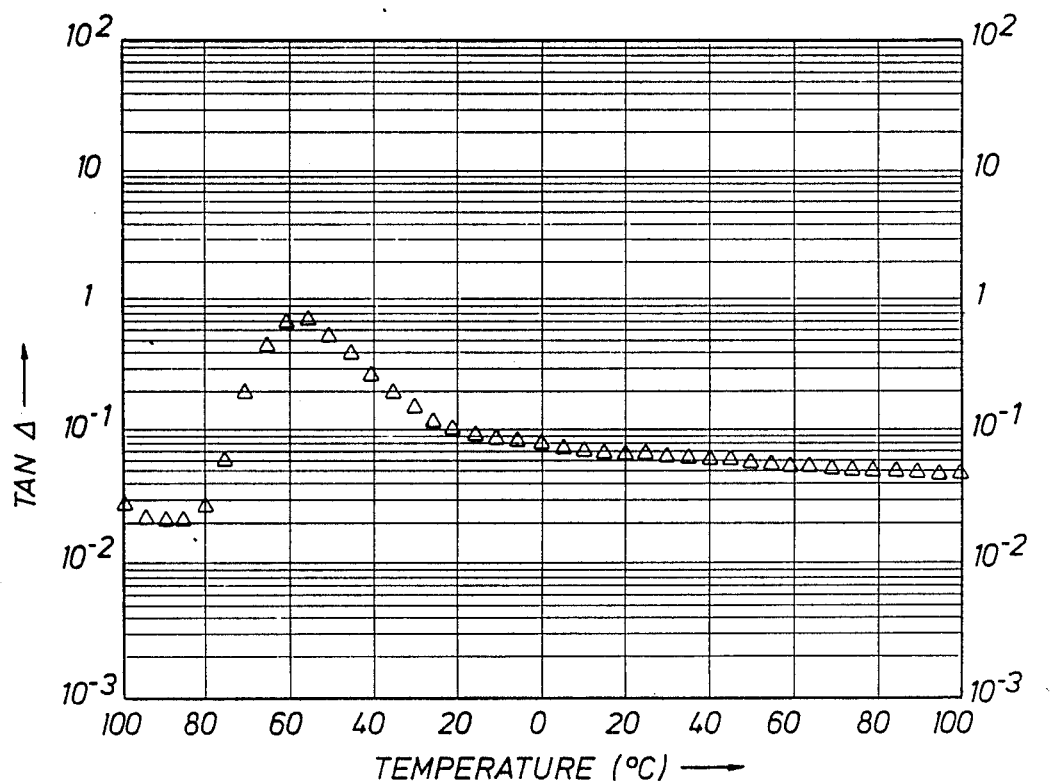

In Comparative Experiment A the styrene content of block (A) was too low and the curve of FIG. 4 shows one maximum only.

Figure 5:
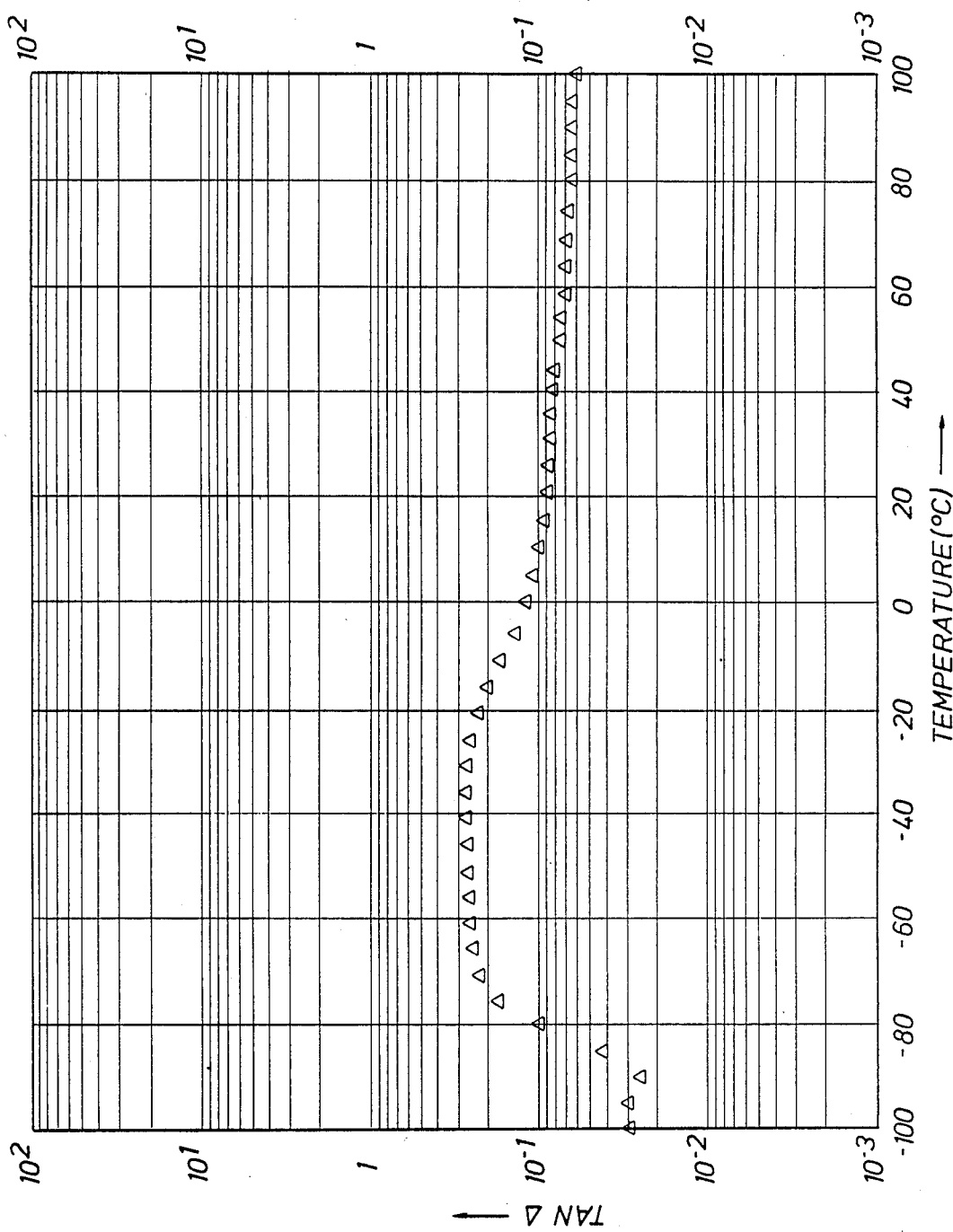
Figure 6:
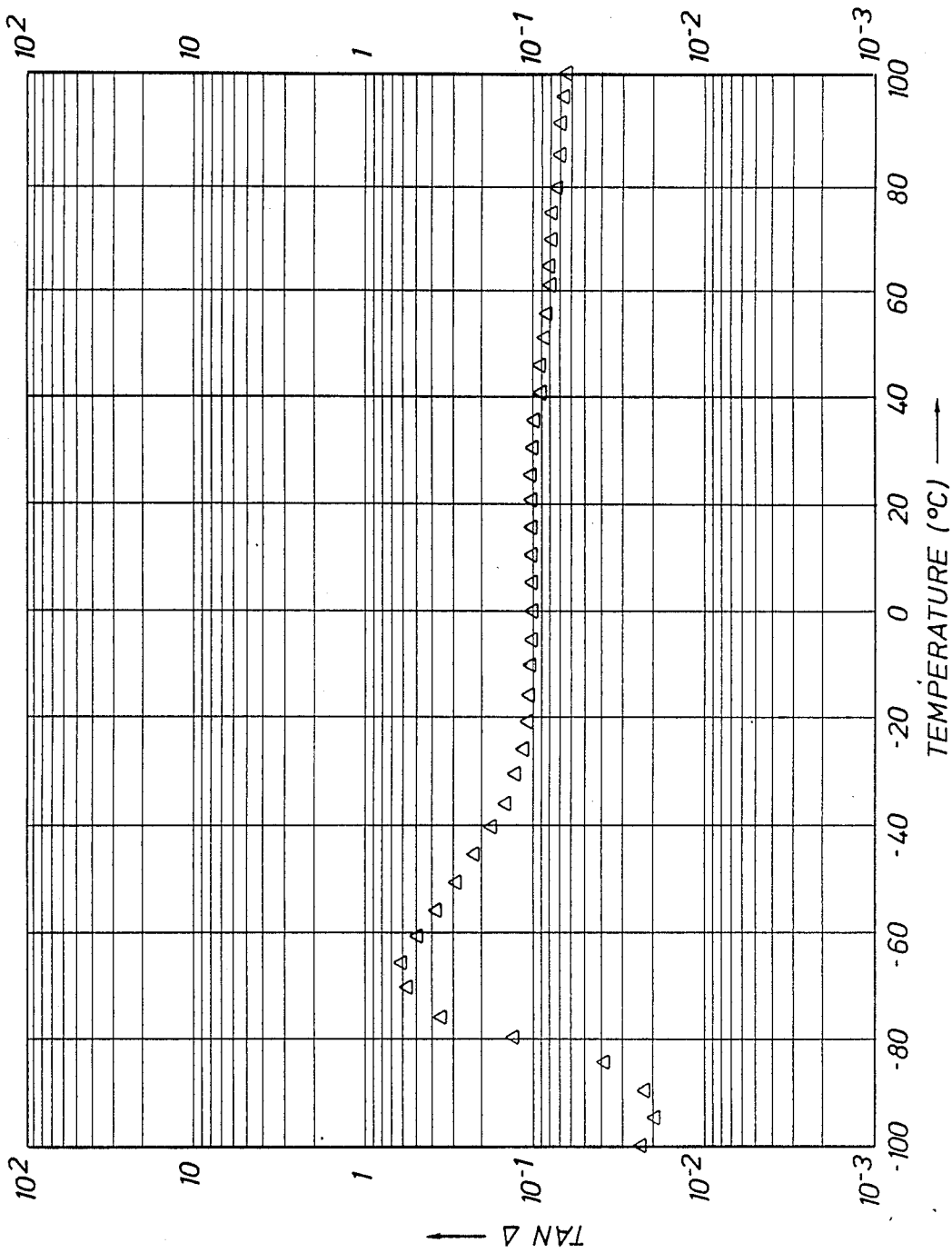
Figure 7:
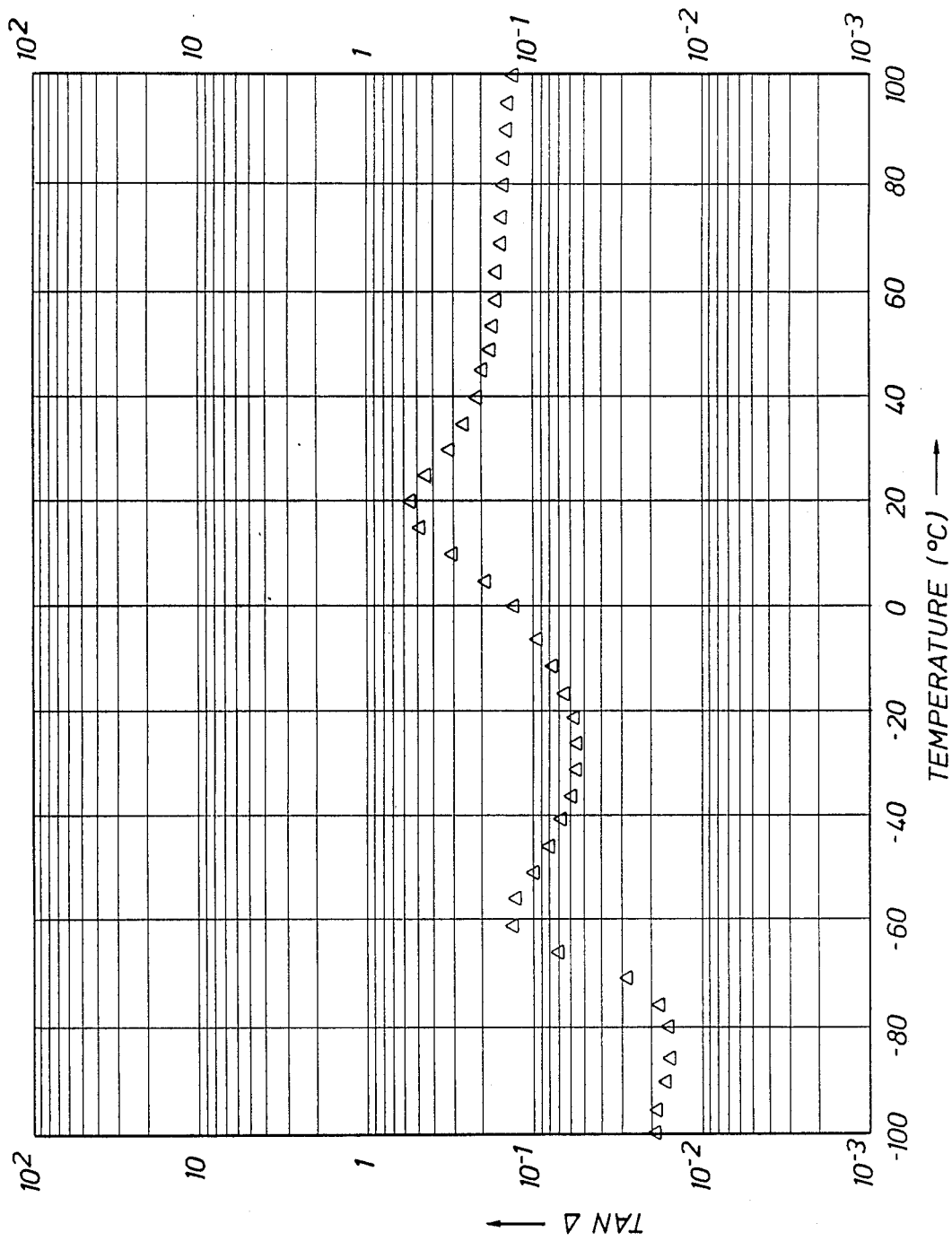
Figure 8:
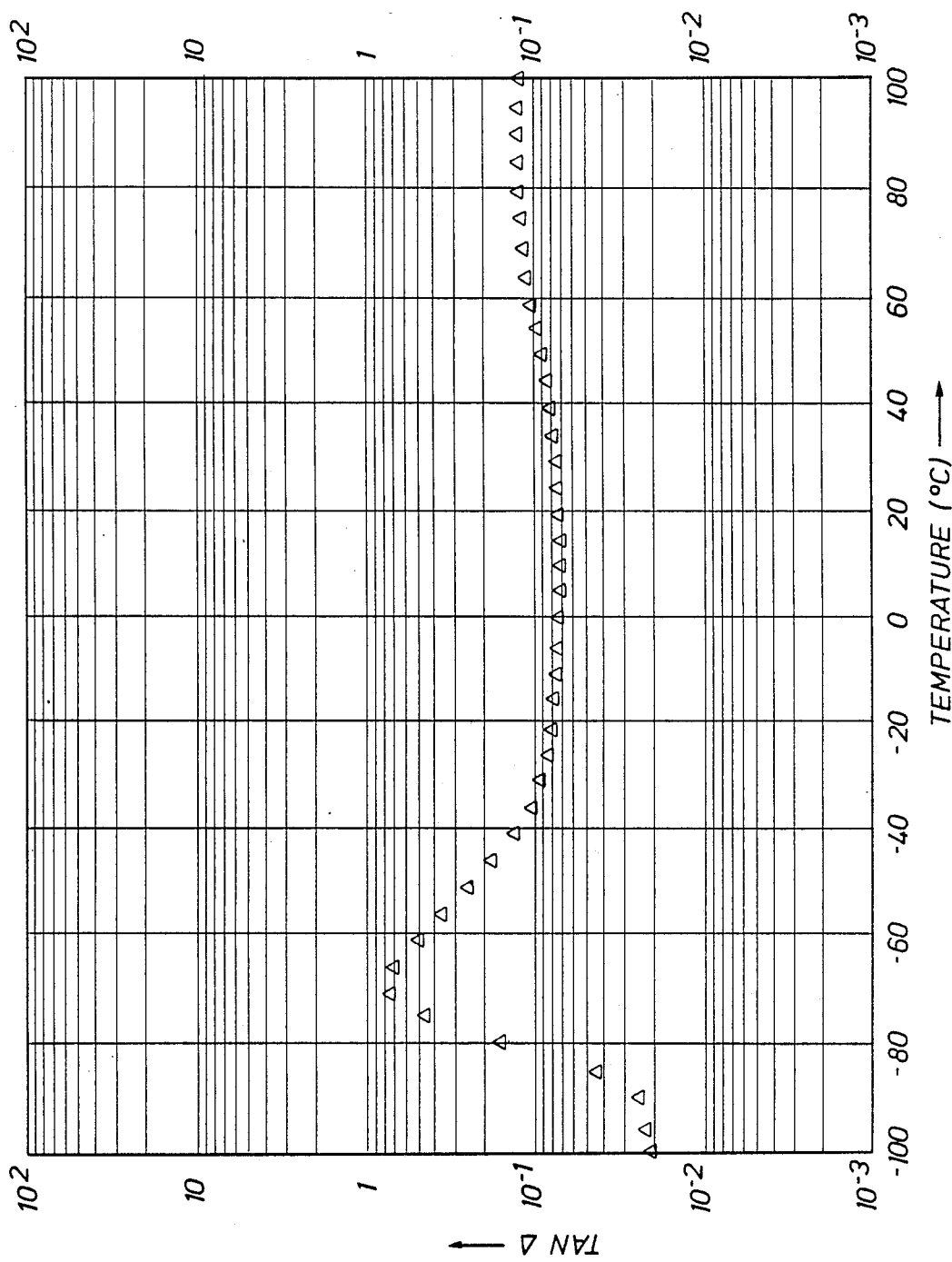

In Comparative Experiment B the styrene content of block (A) was too low and the curve of FIG. 5 shows two maxima, one of which at a temperature of about minus 30° C. In Comparative Experiment C block (A) has too low an average molecular weight. In Comparative Experiment D the vinyl contents of blocks (A) and (B) were too high. In Comparative Experiment E the average molecular weight of block (A) was too low and the curve of FIG. 8 shows two maxima, one of which at a temperature of about plus 80° C.

The wet grip performance of the vulcanized compositions in Comparative Experiments A, B, C and E were considerably below those found in Examples 1, 2 and 3. Comparative Experiment D shows a considerably higher rolling resistance and considerably lower resistance against abrasion than the three Examples.

What is claimed is:

1. A vulcanized elastomeric composition, the vulcanized elastomeric composition comprising the product of vulcanizing an unvulcanized elastomeric composition suitable for use in the tread portion of a pneumatic tire, said unvulcanized elastomeric composition comprising:
   (1) a copolymer (A) of a first aromatic vinyl compound and a first conjugated diene and having a content of said first aromatic vinyl compound in the range of from 52 to 90% by weight based on said copolymer (A), an apparent molecular weight of at least 25,000 and a vinyl content in the conjugated diene units therein of less than 20% by weight, and
   (2) a polymer (B) which is a homopolymer of a second conjugated diene or a copolymer of a second aromatic vinyl compound and said second conjugated diene, said polymer (B) containing less than 20% by weight of said second aromatic vinyl compound and having a glass transition temperature below minus 40° C.,
   (3) said copolymer (A) being present in the range from 5 to 50% by weight and correspondingly said polymer (B) being present in the range of from 95 to 50% by weight based on the combined weight of said copolymer (A) and said polymer (B),
   (4) wherein said copolymer (A) and polymer (B) are present in said unvulcanized elastomeric composition as a block copolymer in which said copolymer (A) and said polymer (B) form the polymeric blocks thereof, and
   (5) wherein after vulcanization of said unvulcanized elastomeric composition a first maximum is present in the range of from plus 30° C. to minus 20° C. and a second maximum is present at a temperature of not higher than minus 40° C. in a curve representing tan δ of said vulcanized elastomeric composition as a function of the temperature, measured at a frequency of 10 Hz and 0.5% strain amplitude, thereby establishing that copolymer block (A) is incompatible with polymer block (B).

2. The vulcanized elastomeric composition as claimed in claim 1, wherein said copolymer (A) and said polymer (B) are present in the range of from 20 to 40% and from 80 to 60% by weight, respectively, calculated on the total of said copolymer (A) and said polymer (B).

3. The vulcanized elastomeric composition as claimed in claim 1, wherein said first and second aromatic vinyl compounds are styrene and said first and second conjugated dienes are 1,3-butadiene.

4. The vulcanized elastomeric composition as claimed in claim 1, wherein the apparent molecular weight of said copolymer (A) is in the range from 25,000 to 175,000.

5. The vulcanized elastomeric composition as claimed in claim 1, wherein content of the conjugated diene units in said copolymer (A) is less than 15% by weight, calculated on the total conjugated diene in said copolymer (A).

6. The vulcanized elastomeric composition as claimed in claim 1, wherein the conjugated diene portions in said copolymer (A) and said polymer (B) have substantially the same vinyl contents.

7. The vulcanized elastomeric composition as claimed in claim 1, wherein the contents of vinyl bonds in the conjugated diene portions in said copolymer (A) and said polymer (B) have a distribution width of substantially zero.

8. The vulcanized elastomeric composition as claimed in claim 1, wherein at least one of each of said copolymer (A) and said polymer (B) have been coupled together by means of a coupling agent.

9. The vulcanized elastomeric composition as claimed in claim 1, wherein said block copolymer is obtained by (a) preparing a prior-to-coupling block copolymer via anionic polymerization by (ii) forming a first polymer block corresponding to said copolymer (A) and (ii) a second polymer block corresponding to said polymer (B) after said first polymer block, and (b) then coupling together two or more of said prior-to-coupling block copolymers.

10. An unvulcanized elastomeric tire composition comprising a blend of an unvulcanized elastomeric composition as claimed in claim 1 with vulcanization compounding ingredients.

11. A tire whose tread has been formed by vulcanizing an unvulcanized elastomeric tire composition as claimed in claim 10.

12. An unvulcanized elastomer composition suitable for use in the tread portion of a pneumatic tire once said unvulcanized elastomeric composition is vulcanized, said unvulcanized elastomeric composition comprising:
 (a) a polymeric composition comprising
  (1) a copolymer (A) of a first aromatic vinyl compound and a first conjugated diene, said copolymer (A) having (i) a content of said first aromatic vinyl compound in the range from 52% to 90% by weight based on said copolymer (A), (ii) an apparent molecular weight of at least 25,000, and (iii) a vinyl content in the conjugated diene portion thereof of less than 20% by weight based on the conjugated diene portion of said copolymer (A), and
  (2) a polymer (B) which is a homopolymer of a second conjugated diene or a copolymer of a second aromatic vinyl compound and said second conjugated diene, said polymer (B) containing less than 20% by weight of said second aromatic vinyl compound and having a glass transition temperature below minus 40° C.,
  (3) said copolymer (A) being present in the range of from 5% to 50% by weight and correspondingly said polymer (B) being present in the range from 95% to 50% by weight based on the combined weight of said copolymer (A) and said polymer (B),
  (4) wherein said copolymer (A) and said polymer (B) are present in said polymeric composition as a physical mixture thereof, as a block copolymer in which said copolymer (A) and said polymer (B) form the polymeric blocks of said block copolymer, and
 (b) an effective vulcanizing amount of a blend of vulcanization compounding ingredients, said blend comprising a combination of
  (1) a vulcanizing agent,
  (2) a vulcanization accelerating agent,
  (3) a vulcanization activating agent,
  (4) a filler,
  (5) an antioxidant, and
  (6) an extender oil,
 (c) wherein after vulcanization of said unvulcanized elastomeric composition a first maximum is present in the range of from plus 30° C. to minus 20° C. and a second maximum is present at a temperature of not higher than minus 40° C. in a curve representing tan δ of said unvulcanized elastomeric composition after vulcanization as a function of the temperature, measured at a frequency of 10 Hz and 0.5% strain amplitude, thereby establishing that said copolymer (A) is incompatible with said polymer (B) or that the block polymer blocks corresponding to same are incompatible with each other.

* * * * *